US005167739A

United States Patent [19]

Hutchinson et al.

[11] Patent Number: 5,167,739

[45] Date of Patent: Dec. 1, 1992

[54] PRESSURE SEAL MULTIPLE PART

[75] Inventors: Wilbur P. Hutchinson, Mt. Prospect, Ill.; Leo Lombardo, Manchester, N.H.

[73] Assignee: Moore Business Forms, Inc., Grand Island, N.Y.

[21] Appl. No.: 795,541

[22] Filed: Nov. 21, 1991

[51] Int. Cl.[5] .............................................. B32B 31/00

[52] U.S. Cl. ...................................... 156/64; 156/291; 156/441.5; 229/69; 462/70; 40/360

[58] Field of Search ............... 156/264, 290, 291, 292, 156/479, 548, 553, 555, 556, 64, 441.5, 442.1; 229/69, 72, 92.1, 92.3, 92.5, 92.7, 314; 462/70; 270/54; 40/360

[56] References Cited

U.S. PATENT DOCUMENTS 3,902,655 9/1975 Hoffman ........................ 229/92.1 X
4,440,341 4/1984 Pennock ............................... 229/69

OTHER PUBLICATIONS

Z-fold Speediseal®, demonstration form, 1991.
C-fold Speediseal®, demonstration form, 1991.
Z-fold Speediseal® form.
Moore brochure "The Speedisealer®, Pressure Seal System for Nonimpact Printers", Jun. 1990.
Moore Paragon "the PostMatic 830", brochure, Feb. 1979.
Moore "Pressure Seal . . . A New Age in Mailing Technology", brochure, Dec. 1990.
Moore Paragraph "An Introduction to Pressure Seal . . . ", brochure, Oct. 1990.

*Primary Examiner*—David A. Simmons
*Assistant Examiner*—James J. Engel, Jr.
*Attorney, Agent, or Firm*—Nixon & Vanderhye

[57] ABSTRACT

A multi page mailer type business form is constructed by applying a first adhesive pattern to the top sheet bottom face perimeter areas, a second adhesive pattern to the bottom sheet top face perimeter areas, and applying third and fourth adhesive patterns to the middle sheet top and bottom face perimeter areas respectively. Variable information is printed on the top, bottom and middle sheets including machine readable identification information (bar code) which is common to the sheets that are to be assembled into a final multi page mailer. The set is accumulated, and verified by scanning the identification information, and then the perimeter adhesive patterns are sealed. The adhesive is preferably pressure sensitive adhesive, and the final mailer produced has a book-like construction. The adhesive patterns are such that the top and bottom sheets can be provided in a stack without the perimeter adhesive patterns aligning, and the middle sheets can be provided in a separate stack. A four-part (or more) form may be constructed by slitting two sheets with adhesive patterns into four.

16 Claims, 4 Drawing Sheets

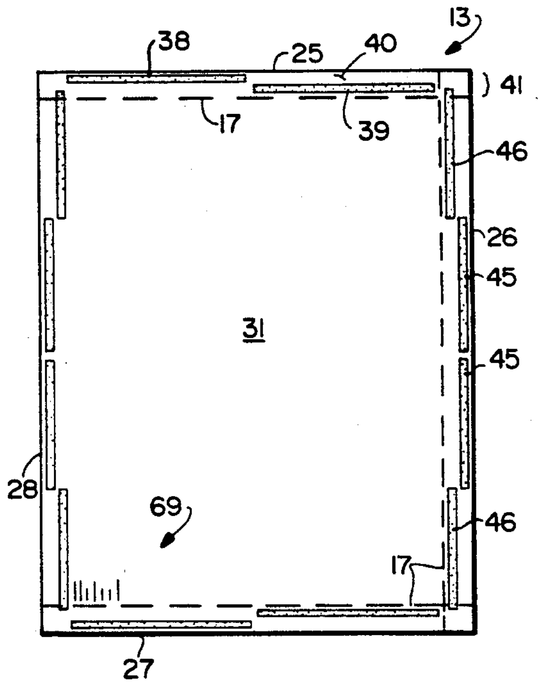
FIG. 7
FIG. 8
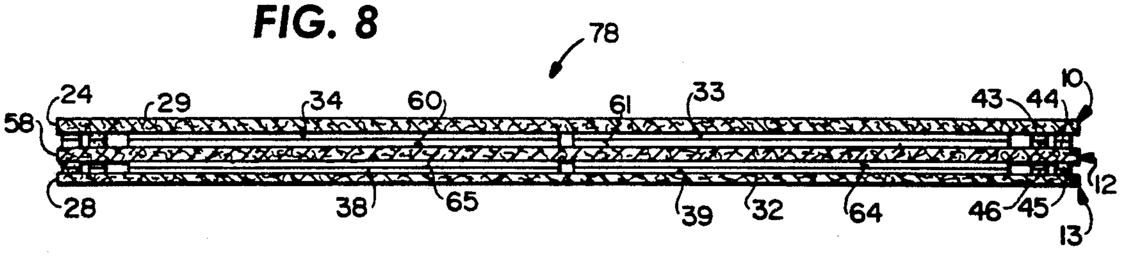

PRESSURE SEAL MULTIPLE PART

BACKGROUND AND SUMMARY OF THE INVENTION

Under present technology it is difficult to produce multiple page mailing documents utilizing self-mailer type constructions in which sheets have adhesive applied to them in a particular manner, and then are folded or otherwise assembled to produce a mailer. Under most circumstances, multiple page mailing documents must be placed into an envelope, or distinctly different (in size and configuration) inserts provided.

According to the present invention, a mailer type business form is provided which can provide a multiple page mailing document, in fact one that opens up like a book. The mailer according to the present invention is preferably produced utilizing pressure sensitive adhesive, such as that marketed by Toppan-Moore with the trade designation TM-124, which is a styrene-natural rubber copolymer. The equipment utilized to seal the mailer preferably comprises that marketed by Moore Business Forms, Inc. of Lake Forest, Illinois as the Moore SPEEDISEALER® pressure sealing assembly.

According to one aspect of the present invention, a method of forming a multi page mailer type business form having a plurality of parts, including top, bottom, and at least one middle, sheets is provided. Each sheet has top and bottom faces, a quadrate shape with four edges, and perimeter edges adjacent the edges. The method comprises the following steps: (a) Applying a first adhesive pattern to the top sheet bottom face perimeter areas. (b) Applying a second adhesive pattern to the bottom sheet top face perimeter areas. (c) Applying a third adhesive pattern to the middle sheet top face perimeter areas, and a fourth adhesive pattern to the middle sheet bottom face perimeter areas. (d) Printing variable information on the top, bottom, and middle sheets, including machine readable identification information which is common to top, bottom, and middle sheets that are to be assembled into a final multi page mailer. (e) Collating and accumulating a set containing a top, bottom, and middle sheet. (f) Verifying that the collated and accumulated set contains matching sheets by scanning the identification information on sheets of that collated set. And, (g) effecting sealing of the perimeter adhesive patterns of the sheets of the collated set so that a multi page mailer type business form is produced.

Step (b) is preferably practiced so that the first and second patterns are disposed so that they do not align with each other when a top sheet bottom face is stacked on the top of a bottom sheet top face, and step (c) is practiced so that the third and fourth adhesive patterns do not align with each other when a stack of middle sheets is formed.

The further steps (h) and (i) are preferably practiced of providing the top and bottom sheets in a stack, alternating top and bottom sheets, and providing the middle sheets in a stack. Then step (d) is practiced by taking sheets from the stack of top and bottom sheets and a separate stack of middle sheets. The printing step is preferably practiced by utilizing a laser printer with main and auxiliary input trays with a stack of top and bottom sheets in the main tray and a stack of middle sheets in the auxiliary tray.

Just prior to step (d), lines of weakness are provided adjacent three edges of the top, bottom and middle sheets, the lines of weakness located inside the perimeter areas, and steps (e)–(g) are practiced so that the multi page mailer type business form produced has the top and bottom sheets permanently sealed together along one edge thereof with the other three edges being freeable by detaching the sheets along the lines of weakness, to provide a book type construction.

Steps (a)–(d) may be practiced with the sheets in continuous form, with the further step of slitting the form at the top, bottom and two middle sheets after step (d).

The adhesive is applied to the perimeter areas in such a way that at least some of the perimeter areas have two strips that are spaced from each other in the width dimension of the perimeter area, but so that one of the adhesive strips is provided at essentially every point along the length of the perimeter areas.

According to another aspect of the present invention a multi page mailer type business form is provided. The mailer form comprises the following elements: A top quadrate sheet having top and bottom faces with first through fourth edges, with perimeter areas adjacent the first through fourth edges. A first pattern of adhesive provided on the top sheet bottom face in the perimeter areas adjacent the first through fourth edges. A bottom quadrate sheet having top and bottom faces with first through fourth edges, with perimeter areas adjacent the first through fourth edges. A second pattern of adhesive provided on the bottom sheet top face in the perimeter areas adjacent the first through fourth edges, the second pattern being non-aligned with the first pattern so that if the top and bottom sheets are stacked the adhesive patterns do not engage each other. A middle quadrate sheet having top and bottom faces with first through fourth edges, with perimeter areas adjacent the first through fourth edges. Third and fourth patterns of adhesive applied to the middle sheet top and bottom faces respectively in the perimeter areas adjacent the first through fourth edges, at least part of the third and fourth patterns being non-aligned so that if a number of middle sheets are stacked one atop the other those adhesive patterns do not engage each other. And, lines of weakness disposed parallel to at least the second through fourth edges, inside of the perimeter areas in each of the top, bottom, and middle sheets, the lines of weakness of each sheet being aligned with the lines of weakness of the other sheets. The adhesive is preferably pressure sensitive adhesive. Where the form consists of the top, bottom and one middle sheet, the third adhesive pattern is aligned with the first adhesive pattern, and the fourth with the second, to facilitate proper sealing, and there is no line of weakness adjacent the first edge. In each perimeter area of each of the sheets the adhesive pattern comprises first and second strips, the strips spaced from each other in the width-wise dimension of the perimeter area, but the strips together extending substantially the entire length of the perimeter area.

The invention also relates to a multi page mailer type business form which comprises the following elements: A top quadrate sheet having top and bottom faces with first through fourth edges, with perimeter areas adjacent the first through fourth edges. A bottom quadrate sheet having top and bottom faces with first through fourth edges, with perimeter areas adjacent said first through fourth edges. A middle quadrate sheet having top and bottom faces with first through fourth edges, with perimeter areas adjacent said first through fourth edges. Pressure sensitive adhesive strips disposed in at least some of the perimeter areas of each of the sheets, the strips being less than one-half the width of the perimeter area in which it is disposed, and being off-center of the perimeter area and parallel to the edge of the sheet with which the perimeter area is associated. And, lines of weakness disposed parallel at least to the second through fourth edges, inside of the perimeter areas in each of the top, bottom, and middle sheets, the lines of weakness of each sheet being aligned with the lines of weakness of the other sheets. Some of the perimeter area adhesive strips are located closer to their associated lines of weakness than their associated edges, and vice-versa.

It is the primary object of the present invention to provide a method and apparatus for effectively producing multiple page mailing documents of a self-mailer type configuration. This and other objects will become clear from an inspection of the detailed description of the invention and from the appended claims.

BRIEF DESCRIPTION OF THE DRAWINGS

FIG. 7 is a top plan view of the top face of the bottom sheet of the mailer constructed according to FIG. 1, the bottom face being a mirror image of FIG. 3;

FIG. 8 is a cross-sectional view of the mailer of FIG. 1, as taken along lines 8-8 of FIG. 1.

DETAILED DESCRIPTION OF THE DRAWING

Figures 1, 2:
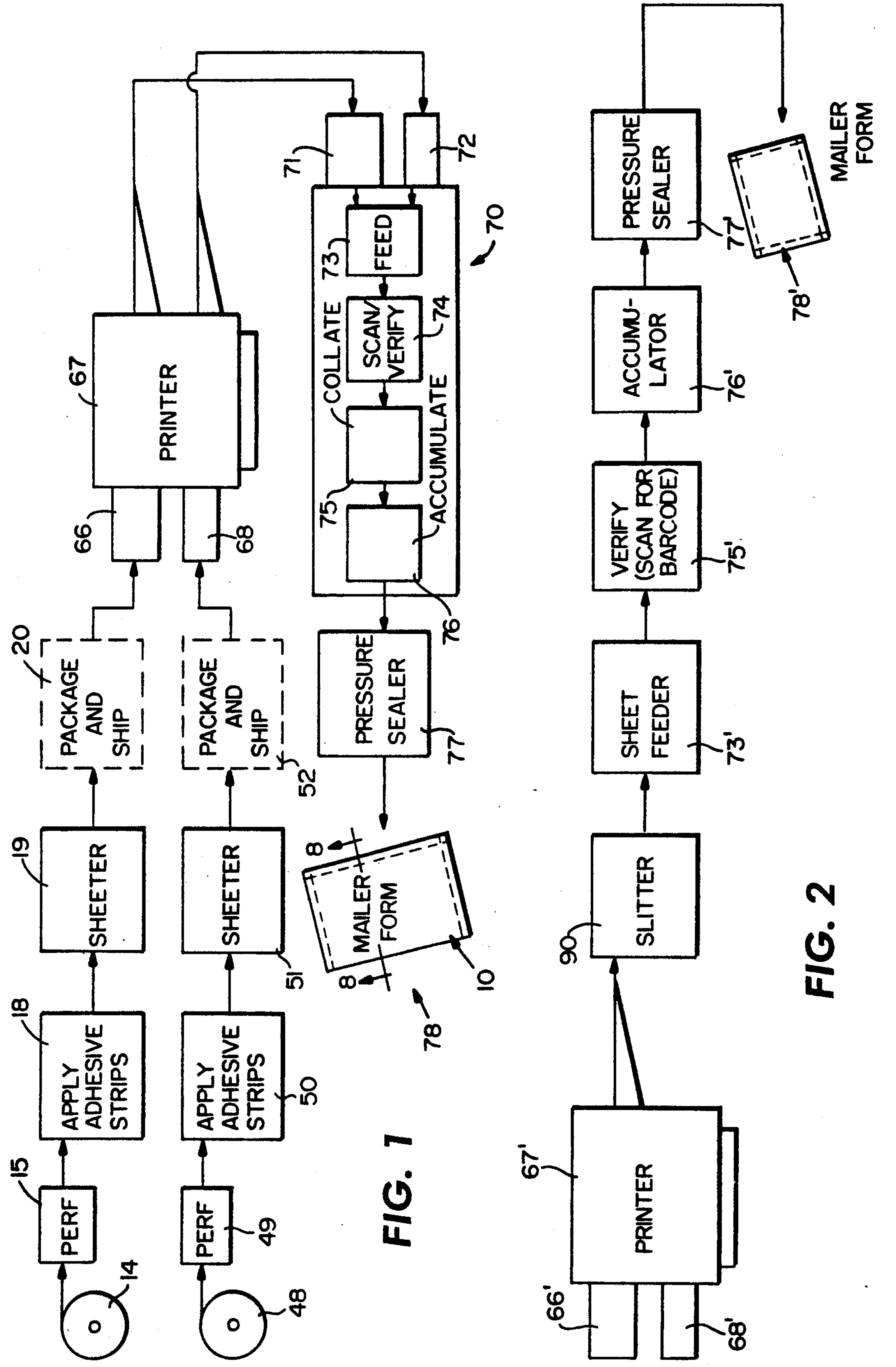
FIG. 1 is a schematic view illustrating a method for the construction of a three part self-mailer business form according to the invention.
FIG. 2 is a schematic like that of FIG. 1 for the construction of a four part form.

FIG. 1 schematically illustrates a method of forming a multi page mailer type business form according to the invention having three different sheets, a top sheet 10 (see FIGS. 1, 3, 4, and 8), a middle sheet 12 (see FIGS. 5, 6, and 8), and a bottom sheet 13 (see FIGS. 7 and 8).

The top and bottom sheets 10, 13 are manufactured simultaneously from the roll/web of paper 14. At stage 15 they are acted upon to provide perforations inside of the perimeter areas of three of the edges thereof in the final sheets to be produced, as indicated by the perforations 16 and 17, respectively in FIGS. 3, 4, and 7. Adhesive is applied to one face of the web, and then the other, to provide adhesive patterns on the bottom face of the top sheet 10 and the top face of the bottom sheet 13, respectively, at stage 18, preferably utilizing a conventional application unit for the application of pressure activated adhesive such as that marketed by Toppan-Moore under the designation TM-124 which is a styrene-natural rubber copolymer; or the Fuller HL-9016 adhesive. Then the web is passed to a conventional sheeter 19 to form sheets, which then may be optionally packaged and shipped as indicated at stage 20 for transportation to the printing location.

Figure 3:
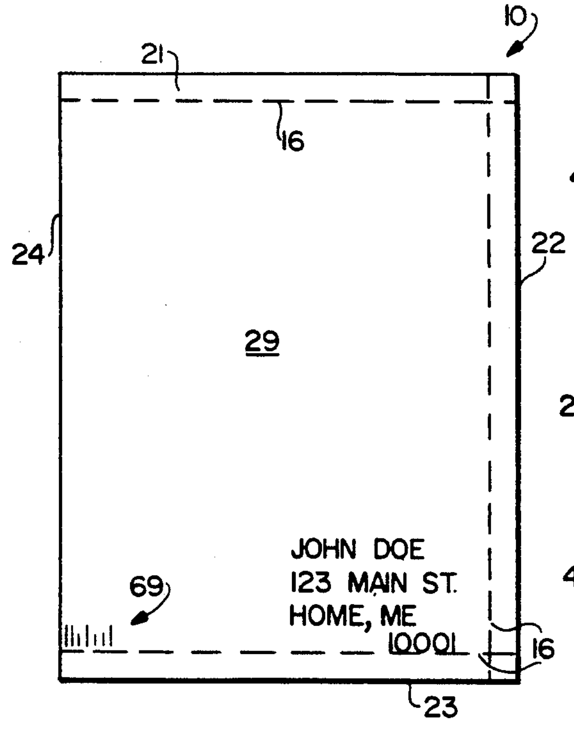
FIGS. 3 and 4 are top plan views of the top sheet top face and bottom face, respectively, of the three part mailer constructed according to FIG. 1.
Figure 4:
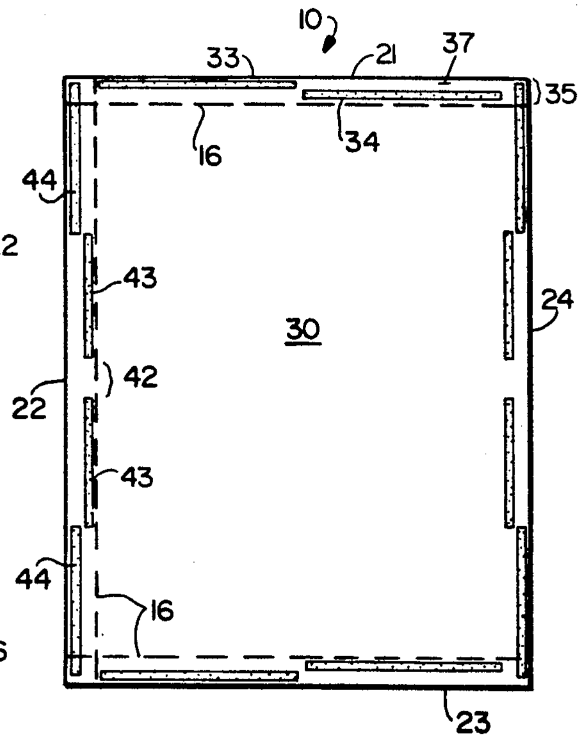

After action by the sheeter 19, the top sheet 10 and the bottom sheet 13 have the configurations illustrated in FIGS. 3, 4, and 7, respectively. Each sheet is quadrate in shape, the sheet 10 having four edges 21 through 24, and the sheet 13 having the edges 25 through 28. The top sheet 10 has a top face 29 (FIG. 3) which is adapted to contain address information or the like, and a bottom face 30 (FIG. 4) which has the pressure sensitive adhesive patterns (strips) applied thereto. The bottom sheet 13 top face 31 (FIG. 7) has pressure sensitive patterns applied to the perimeter areas thereof, while the bottom face 32 (see FIG. 8) has no adhesive.

On the face 30 the pressure sensitive adhesive is applied in a first pattern—as seen in FIG. 4—which does not align with the second pattern of such adhesive—see FIG. 7—on the top face 31 of the bottom sheet 13. Thus the two sheets 10, 13 can be provided in a stack yet there will be no alignment between the pressure sensitive adhesive pattern/strips, and thus no tendency for the sheets 10, 13 to stick together in a stack.

Note from FIG. 4 strips 33 and 34 adjacent the top edge 21 above the line of weakness (perforation) 16 parallel to the top edge 21. Each strip 33, 34, has a width slightly less than half of the width 35 of the perimeter area 37. The strip 33 is located adjacent the edge 21, while the strip 34 is located adjacent the perf 16. Similarly, the adhesive strips 38, 39 associated with the perimeter area 40 between the top edge 25 and its corresponding parallel line of weakness 17 of the top face 31 of the bottom sheet 13 each have a width less than half of the width 41 of the perimeter area 40, with the strip 38 closer to the edge 25 and the strip 39 closer to the perforation 17. In this way, when the edges 21, 25 are aligned (at the same time that the edges 24, 28 are) the strip 38 will engage the portion of perimeter area 37 above the strip 34, while the strip 39 will engage the portion of the perimeter area 37 below the strip 33. Therefore the adhesive strips 33, 34, 38, 39 are non-aligned, and will not have a tendency to stick together when the sheets 10, 13 are in stacks with the faces 30, 31 abutting each other.

Similar adhesive patterns are provided for the other perimeter areas of the sheets 10, 13, as illustrated in FIG. 3. In each case, preferably first and second strips are provided which are spaced from each other in the width-wise dimension of that particular perimeter area, but the strips together extending substantially the entire length of the perimeter area. While the strips extend substantially the entire length of the perimeter area they do not need to—and usually do not—extend the entire length. For example there may be minor gaps, such as illustrated by the gap 42 in FIG. 4 associated with the strip 43, and other aberrations. The strip 43, 44, for example, extend substantially the entire length of the edge 22, only to the extent that the mailer will have integrity and sufficient handlability to meet current postal regulations, including avoiding surcharges for oversized mailings. Preferably the entire first pattern of adhesive, as illustrated in FIG. 4, is non-aligned with the entire second pattern of adhesive, as illustrated in FIG. 7. That is the strips 43, 44 are also non-aligned with the strips 45, 46, and similarly for the rest of the strips.

Figure 5:
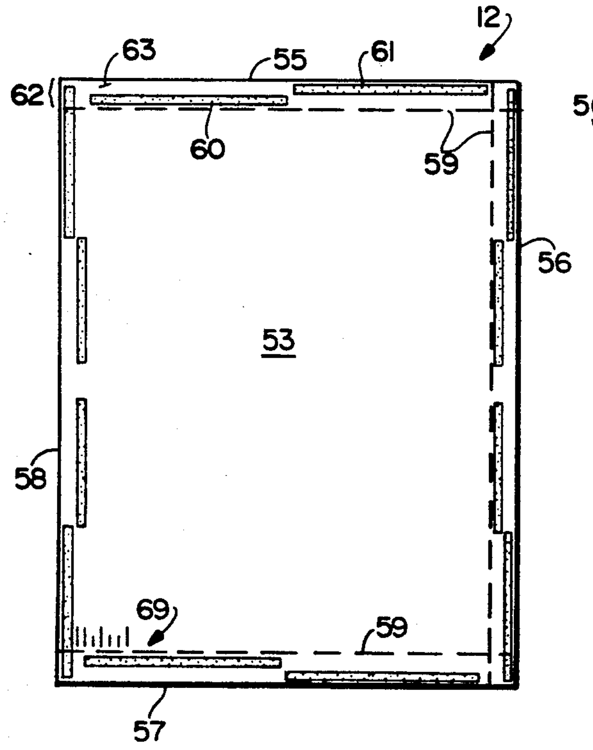
FIGS. 5 and 6 are top plan views of the top and bottom faces, respectively, of the middle sheet of the mailer constructed according to FIG. 1.
Figure 6:
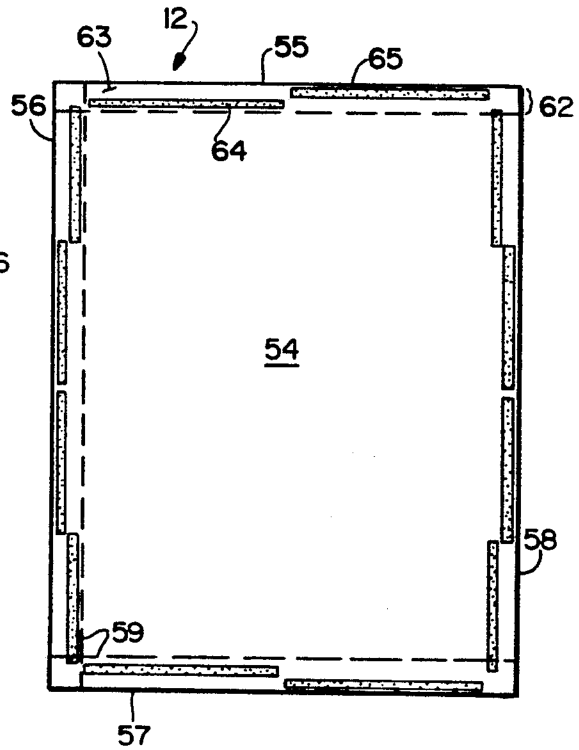

The middle sheets 12 are constructed from the roll-/web of paper 48, being perfed at 49, adhesive strips being applied at 50, sheeted at 51, and packaged and shipped at 52. The construction of a typical middle sheet 12 after sheeting at 51 is illustrated in FIGS. 5 and 6. It too is a quadrate sheet having a top face 53 and a bottom face 54, and four edges 55, 56, 57, and 58. Lines of weakness—perforations—59 are formed parallel only to the edges 55 through 57 to be in alignment with the perforations 16, 17 of the top and bottom sheets 10, 13, respectively when the final mailer is constructed.

For the middle sheets 12, a third pattern of pressure sensitive adhesive is applied to the perimeter areas of the top face 53, and a fourth pattern applied to the bottom face 54, as seen in FIGS. 5 and 6 respectively. As with respect to the top and bottom sheets 10, 13, the adhesive patterns in the perimeter areas of the middle sheet 12 are preferably strips having a width less than half of the width of the perimeter area with which they are associated, but collectively extending substantially the entire length of the perimeter area with which they are associated, and being offset so that if a number of sheets 12 are provided in a stack the third and fourth patterns of adhesive do not align so that the sheets 12 will not stick together. For example, the strip 60 is provided in the lower half, and the strip 61 in the upper half, of the width 62 of the top perimeter area 63 (between top edge 55 and perforation 59) on the face 53. For the face 54, the strips 64, 65 are arranged opposite to the strips 60, 61 in the perimeter area 63 so that if a face 53 abuts a face 54 in a stack, the strip 60 will be below the strip 65 in the perimeter area 63, while the strip 61 will be above the strip 64 in that same perimeter area 63.

The third pattern of adhesive—as illustrated in FIG. 5—corresponds to the first pattern of adhesive—illustrated in FIG. 4—so that when a face 30 engages a face 53, all of the strips of adhesive align. For example the strips 33, 61 and 34, 60, respectively align. Similarly, the pattern provided on face 54 is the same as that provided on face 31 so that when the faces 31, 54 abut all of the adhesive strips engage, for example the strips 65, 38 and 39, 64 respectively engaging each other. Therefore in the optional packaging and shipping stages 20, 52, the sheets 10, 13 can be provided in one stack, and the sheets 12 in another stack.

As illustrated in FIG. 1, after the optional packaging and shipping stages 20, 52 the sheets 10, 13 are provided in a vertical stack into the main tray 66 of a non-impact printer, such as a laser printer 67. The sheets 12 are provided in a vertical stack in the auxiliary tray 68 of the printer 67. The printer 67 is controlled by first printing (preferably duplex printing) a sheet 10 from tray 66, then a sheet 12 from tray 68, and then a sheet 13 from tray 66, the sequence being repeated. When the printer 67 effects printing, it also preferably prints machine (and human if desired) readable identification information on each of the sheets 10, 12, 13 that are to be provided in a final mailer. For example, as illustrated in FIGS. 3, 5, and 7, the same bar code 69 could be printed on each of the sheets 10, 12, 13 of the sheets 10, 12, 13 of a particular set.

After printing by the printer 67, the sheets are further acted upon to collate them before sending them to the pressure sealer. One way that this can be done is to utilize the equipment shown schematically at 70 in FIG. 1, which is a conventional dual sheet feeder/accumulator having infeed hoppers 71 (for the sheets 10, 13) and 72 (for the sheets 12). In the equipment 70, the sheets are fed from the hoppers 71, 72, respectively, in the desired sequence (a sheet 10, then its corresponding sheet 12, then its corresponding sheet 13), as indicated schematically at 73, then they are scanned for verification as illustrated schematically at 74.

The scanning/verification stage 74 utilizes any conventional reader which can read the bar coding 69 or like identification information to make sure that the proper sheets 10, 12, 13 are provided. The sheets are then collated at 75, and accumulated at 76, before being fed to a conventional pressure sealer 77 such as a Moore 4800 pressure sealer. The equipment 70 thus preferably simultaneously performs the verifying, collating, and accumulating steps.

At the pressure sealer 77 rollers act upon the marginal areas of the sheets 10, 12, 13 to seal all the aligned adhesive strips together to produce a final mailer 78, illustrated in FIGS. 1 and 8. Note that the mailer 78 has perforations along three edges thereof, but not the fourth edge (not adjacent the edges 24, 28, 58 as illustrated in FIG. 8), so that when the sheets are torn along the perforations 16, 17, 59 a book type construction is provided.

Figure 9:
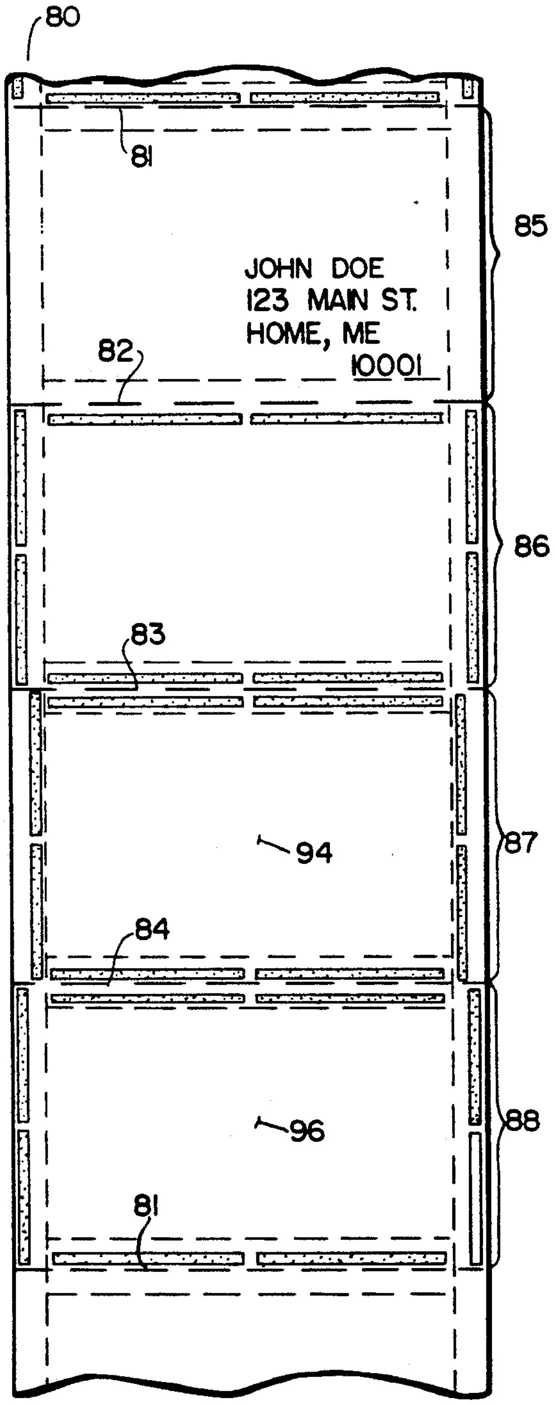
FIGS. 9 and 10 are top and bottom plan views, respectively, of the continuous form of mailer that is utilized to produce the four part mailer according to FIG. 2.
Figure 10:
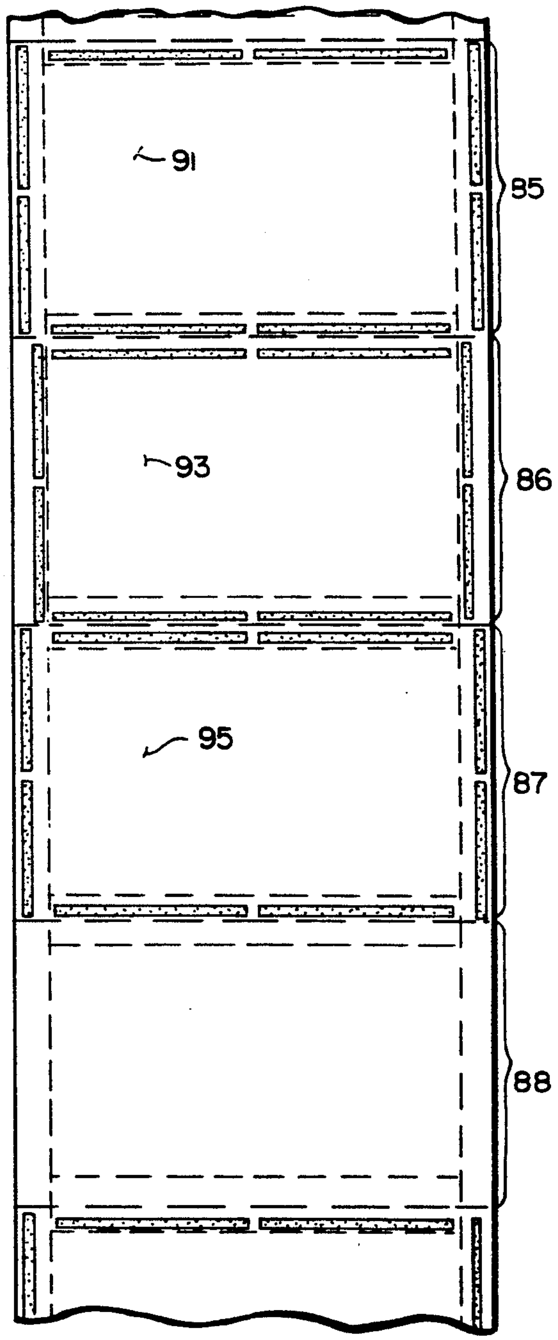

FIGS. 2, 9, and 10 illustrate a second form of mailer type business form that can be constructed according to the invention, this one a four part form. In this procedure, prior to the printer 67′ of FIG. 2 a single roll, perfer, adhesive applicator set, and sheeter could be provided so that—prior to sheeting—a continuous form construction as illustrated at 80 in FIGS. 9 and 10, could be provided. The continuous sheets 80 would be separated by longitudinal perf line 81, 82, 83, and 84 into four different sheets which will ultimately be formed, a top sheet 85, first and second middle sheets 86, 87, respectively, and a bottom sheet 88. The sheeter would separate the sheets so that the top sheet 85 and first middle sheet 86 were on one master sheet, while the bottom sheet 88 and second middle sheet 87 formed another master sheet. The master sheet containing sheets 85, 86 have the adhesive pattern applied thereto, as illustrated in FIGS. 9 and 10—so that when they are disposed in a stack there is non-alignment between at least some of the adhesive patterns in the perimeter areas of the various sheets, so that there is little tendency to stick together. The same is true for the master sheets formed by the components 87, 88.

The master sheets 85, 86 are fed to the tray 66′ of printer 67′, while master sheets 87, 88 are fed to the tray 68′. After duplex printing of the sheets by the printer 67′, they pass to a conventional slitter 90, which slits the master sheets into individual sheets 85, 86, 87, 88. Then they are fed by a sheet feeder 73′ to a verify/scan stage 75, and then to the collator/accumulator 76′ and then to the pressure sealer 77′, to produce the final mailer 78′. The bar codes, or like verifiable identification information, printed by the printer 67′ on each of the ultimate sheets 85 through 88 are not illustrated in FIGS. 9 and 10. Note that the adhesive pattern on the back face 91 of the top sheet 85 matches the adhesive pattern on the top face 92 of the first middle sheet 86; and the adhesive pattern on the bottom face 93 of the first middle sheet 86 matches that on the top face 94 of the second middle sheet 87; while the adhesive pattern on the bottom face 95 of the second middle sheet 87 matches the adhesive pattern on the top face 96 of the bottom sheet 88. Thus, after collating and accumulation of the sheets 85 through 88 all of the pressure sensitive adhesive strips on the abutting faces are aligned so that the pressure sealer 77′ may effect proper sealing thereof.

All of the components 90, 73′, 75′, and 76′ may be provided within a conventional piece of hardware, such as those supplied by Rollem, GBR, and ITC for slitting and merge sheets.

It will thus be seen that according to the present invention the following basic method may be practiced:

(a) Applying a first adhesive pattern (see FIG. 4) to the top sheet 10 bottom face 30 perimeter areas.

(b) Applying a second adhesive pattern (see FIG. 7) to the bottom sheet 13 top face 31 perimeter areas.

Both steps (a) and (b) are practiced at stage 18, while at stage 50 there is the step of (c) applying a third adhesive pattern (FIG. 5) to the middle sheet 12 top face 53, and a fourth adhesive pattern (see FIG. 6) to the middle sheet 12 bottom face 54 perimeter areas.

(d) Printing variable information, with printer 67, preferably duplex laser printing, the sheets 10, 12, and 13, including with machine readable identification information (69) which is common to top, bottom, and middle sheets 10, 13, 12 that are to be assembled into a final multi page mailer 78.

(e) Collating and accumulating (at 75/76) a set containing matched top, bottom, and middle sheets 10, 13, 12; and (f) preferably simultaneously verifying (at scanner stage 74) that the collated and accumulated set contains matching sheets by scanning the identification information 69. And, (g) Effecting sealing, with pressure sealer 77, of the perimeter adhesive patterns of the sheets 10, 12, 13 of the collated set so that the multi page mailer type business form 78 is produced.

It will thus be seen that according to the present invention a method has been provided for producing a multiple page self-mailer according to the invention, which mailer meets current postal regulations and is constructed in a simple yet effective manner. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent procedures and products.

What is claimed is:

1. A method of forming a multi page mailer type business form having a plurality of parts, including top, bottom, and at least one middle, sheets, each sheet having top and bottom faces, a quadrate shape with four edges, and perimeter areas adjacent the edges, said method comprising the steps of:

(a) applying a first adhesive pattern to said top sheet bottom face perimeter areas;

(b) applying a second adhesive pattern to said bottom sheet top face perimeter areas;

(c) applying a third adhesive pattern to said middle sheet top face perimeter areas, and a fourth adhesive pattern to said middle sheet bottom face perimeter areas;

(d) printing variable information on the top, bottom, and middle sheets, including machine readable identification information which is common to top, bottom, and middle sheets that are to be assembled into a final multi page mailer;

(e) verifying that the collated and accumulated set contains matching sheets by scanning the identification information on sheets of that collated set;

(f) collating and accumulating a set containing a top, bottom, and middle sheet; and (g) effecting sealing of the perimeter adhesive patterns of the sheets of the collated set so that a multi page mailer type business form is produced.

2. A method as recited in claim 1 wherein step (b) is practiced so that the first and second patterns are disposed so that they do not align with each other when a top sheet bottom face is stacked on top of a bottom sheet top face, and then practicing the further step (h) of providing the top and bottom sheets in a stack, alternating top and bottom sheets; and wherein step (c) is practiced so that the third and fourth adhesive patterns do not align with each other when a stack of middle sheets is formed, and practicing the further step (i) of providing the middle sheets in a stack; and wherein step (d) is practiced by taking sheets from the stack of top and bottom sheets, and the separate stack of middle sheets.

3. A method as recited in claim 2 comprising the further step (j), prior to step (d), of providing lines of weakness adjacent three edges of said top, bottom and middle sheets, the lines of weakness being located inside the perimeter areas, and wherein steps (e)-(g) are practiced so that the multi page mailer type business form produced has the top and bottom sheets permanently sealed together along one edge thereof, with the other three edges being freeable by detaching the sheets along the lines of weakness, to provide a book type construction.

4. A method as recited in claim 2 wherein step (d) is practiced by duplex, non-impact printing of the sheets.

5. A method as recited in claim 4 utilizing a laser printer having main and auxiliary input trays; and wherein step (d) is further practiced by placing the stack of top and bottom sheets in the main tray, and the stack of middle sheets in the auxiliary tray, and controlling the printer to print the sheets of each set in the order top, middle, and bottom.

6. A method as recited in claim 1 wherein step (a) is practiced by applying adhesive strips to the perimeter areas in such a way that at least some of the perimeter areas have two strips that are spaced from each other in the width dimension of the perimeter area, but so that one of the adhesive strips is provided at essentially every point along the length of the perimeter areas.

7. A method as recited in claim 6 wherein steps (a) and (b) are practiced by applying pressure sensitive adhesive.

8. A method as recited in claim 7 wherein step (b) is practiced by applying adhesive strips to the perimeter areas in such a way that at least some of the perimeter areas have two strips that are spaced from each other in the width dimension of the perimeter area, but so that one of the adhesive strips is provided at essentially every point along the length of the perimeter areas.

9. A method as recited in claim 1 and wherein step (d) is practiced by printing a bar code on each of the top, bottom, and middle sheets as the identification indicia.

10. A method as recited in claim 2 wherein said steps are practiced to provide only one middle sheet for each set, the third adhesive pattern matching the first adhesive pattern, and the fourth adhesive pattern matching the second adhesive pattern.

11. A method as recited in claim 1 wherein step (f) is practiced simultaneously with step (e) so that the sheets are being scanned and verified as they are being accumulated.

12. A method as recited in claim 8 wherein steps (a) and (b) are practiced to provide width spaced strips of pressure sensitive adhesive in all four perimeter areas of the top sheet bottom face, bottom sheet top face, and middle sheet top and bottom faces.

13. A method as recited in claim 12 wherein said steps are practiced to provide only one middle sheet for each set, the third adhesive pattern matching the first adhesive pattern, and the fourth adhesive pattern matching the second adhesive pattern.

14. A method as recited in claim 13 comprising the further step (h), prior to step (d), of providing lines of weakness adjacent three edges of said top, bottom and middle sheets, the lines of weakness being located inside the perimeter areas, and wherein said steps are practiced so that the multi page mailer type business form produced has the top and bottom sheets permanently sealed together along one edge thereof, with the other three edges being freeable by detaching the sheets along the lines of weakness, to provide a book type construction.

15. A method as recited in claim 1 wherein steps (a)-(d) are practiced with the sheets in continuous form, and comprising the further step (h) of slitting the form into top, bottom, and two middle sheets after step (d).

16. A method as recited in claim 2 wherein step (a) is practiced by applying adhesive strips to the perimeter areas in such a way that at least some of the perimeter areas have two strips that are spaced from each other in the width dimension of the perimeter area, but so that one of the adhesive strips is provided at essentially every point along the length of the perimeter areas.

* * * * *